(12) United States Patent
Stamps et al.

(10) Patent No.: US 7,665,969 B2
(45) Date of Patent: Feb. 23, 2010

(54) ASSEMBLY FOR PROVIDING FLEXURE TO BLADE SYSTEM

(75) Inventors: Frank B. Stamps, Colleyville, TX (US); Patrick R. Tisdale, Roanoke, TX (US); James L. Braswell, Colleyville, TX (US); Charles L. Baskin, Jr., Arlington, TX (US); Tom Campbell, Fort Worth, TX (US); Timothy K. Ledbetter, Euless, TX (US); Joseph J. Zierer, Fort Worth, TX (US); D. J. Reddy, Hurst, TX (US); Mark A. Wiinikka, Hurst, TX (US); Ronnie L. Martin, Arlington, TX (US); David A. Haynie, Euless, TX (US); Stanley Gene Sadler, Arlington, TX (US); Ron Measom, Hurst, TX (US); Paul Oldroyd, Azle, TX (US); Tricia Hiros, Haltom City, TX (US); Jim Harse, Bedford, TX (US); Bob Mullins, Mansfield, TX (US)

(73) Assignee: Bell Helicopter Textron Inc., Hurst, TX (US)

( * ) Notice: Subject to any disclaimer, the term of this patent is extended or adjusted under 35 U.S.C. 154(b) by 354 days.

(21) Appl. No.: 11/040,173

(22) Filed: Jan. 24, 2005

(65) Prior Publication Data
US 2006/0165527 A1    Jul. 27, 2006

(51) Int. Cl.
B63H 1/06    (2006.01)
(52) U.S. Cl. .................. 416/134 A; 416/135; 416/140; 416/141

(58) Field of Classification Search ............. 416/134 R, 416/134 A, 135 R, 135 A, 140 A, 141, 135, 416/140
See application file for complete search history.

(56) References Cited

U.S. PATENT DOCUMENTS

| 3,669,566 A | 6/1972 | Bourquardez et al. |
| 3,999,887 A | 12/1976 | McGuire |
| 4,008,980 A | 2/1977 | Noehren et al. |
| 4,021,141 A | 5/1977 | Watson |
| 4,047,839 A * | 9/1977 | Ferris et al. ............. 416/134 A |
| 4,093,400 A | 6/1978 | Rybicki |
| 4,182,597 A | 1/1980 | Derschmidt |
| 4,201,515 A | 5/1980 | Derschmidt et al. |
| 4,203,709 A | 5/1980 | Watson |

(Continued)

*Primary Examiner*—Hoang M Nguyen
(74) *Attorney, Agent, or Firm*—Pillsbury Winthrop Shaw Pittman LLP

(57) ABSTRACT

An assembly for providing flexure to a blade of a rotary blade system, the assembly including an upper support plate having an upper curved surface, a lower support plate having a lower curved surface, and a yoke positioned therebetween. At least one of the upper and lower yoke surfaces having a layer of cushioning material positioned thereon and secured thereto. The layer of cushioning material extending along and following the general contour of yoke surface, and the layer of cushioning material directly contacting a support plate. Another embodiment is an assembly for providing flexure to a blade of a rotary blade system, including, an upper support plate having an upper curved surface, a lower support plate having a lower curved surface, and a yoke positioned therebetween and directly contacting the support plates wherein one of the curved surfaces is a non-circular arc that does not form part of the circumference of a circle.

41 Claims, 14 Drawing Sheets

U.S. PATENT DOCUMENTS

| | | |
|---|---|---|
| 4,222,709 A | 9/1980 | Mouille |
| 4,227,857 A * | 10/1980 | Reyes .................... 416/134 A |
| 4,227,859 A | 10/1980 | Gouzien et al. |
| 4,273,511 A | 6/1981 | Mouille et al. |
| 4,297,080 A | 10/1981 | Krauss et al. |
| 4,306,837 A | 12/1981 | Brogdon et al. |
| 4,332,525 A | 6/1982 | Cheney, Jr. |
| 4,344,739 A | 8/1982 | Derschmidt et al. |
| 4,352,631 A | 10/1982 | Buchs et al. |
| 4,369,018 A | 1/1983 | Brunsch et al. |
| 4,381,902 A | 5/1983 | Head et al. |
| 4,427,340 A | 1/1984 | Metzger et al. |
| 4,430,045 A | 2/1984 | Cresap |
| 4,455,123 A | 6/1984 | Sanders et al. |
| 4,564,336 A | 1/1986 | Sampatacos |
| 4,650,401 A * | 3/1987 | Yao et al. ................ 416/134 A |
| 4,676,720 A | 6/1987 | Niwa et al. |
| 5,110,259 A * | 5/1992 | Robinson ............... 416/134 A |
| 5,211,538 A * | 5/1993 | Seghal et al. .................... 416/1 |
| 5,358,381 A * | 10/1994 | Covington et al. ...... 416/134 A |
| 5,820,344 A | 10/1998 | Hamilton et al. |
| 6,375,425 B1 | 4/2002 | Lee et al. |
| 6,695,106 B2 | 2/2004 | Smith et al. |
| 6,708,921 B2 | 3/2004 | Sims et al. |

* cited by examiner

ASSEMBLY FOR PROVIDING FLEXURE TO BLADE SYSTEM

BACKGROUND OF THE INVENTION

Field of the Invention

The present invention relates to improvements for a rotor of a vehicle. More specifically, the present invention relates to improvements relating to providing for the flapping of rotor blades used in aircraft.

SUMMARY OF THE INVENTION

One aspect of the invention relates to an assembly for providing flexure to a blade of a rotary blade system, comprising an upper support plate having an upper curved surface; a lower support plate having a lower curved surface; and a yoke positioned between said upper support plate and said lower support plate, said yoke having an upper yoke surface and a lower yoke surface, one yoke surface of said upper and lower yoke surfaces having a layer of cushioning material positioned on and secured to said one yoke surface, said layer of cushioning material extending along and following the general contour of said one yoke surface, and said layer of cushioning material directly contacting one of said upper curved surface of said upper support plate and said lower curved surface of said lower support plate.

Another aspect of the invention relates to an assembly for providing flexure to a blade of a rotary blade system, comprising an upper support plate having an upper curved surface; a lower support plate having a lower curved surface; and a yoke positioned between and directly contacting said upper support plate and said lower support plate, wherein one of said upper curved surface and said lower curved surface is a non-circular arc that does not form part of the circumference of a circle.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
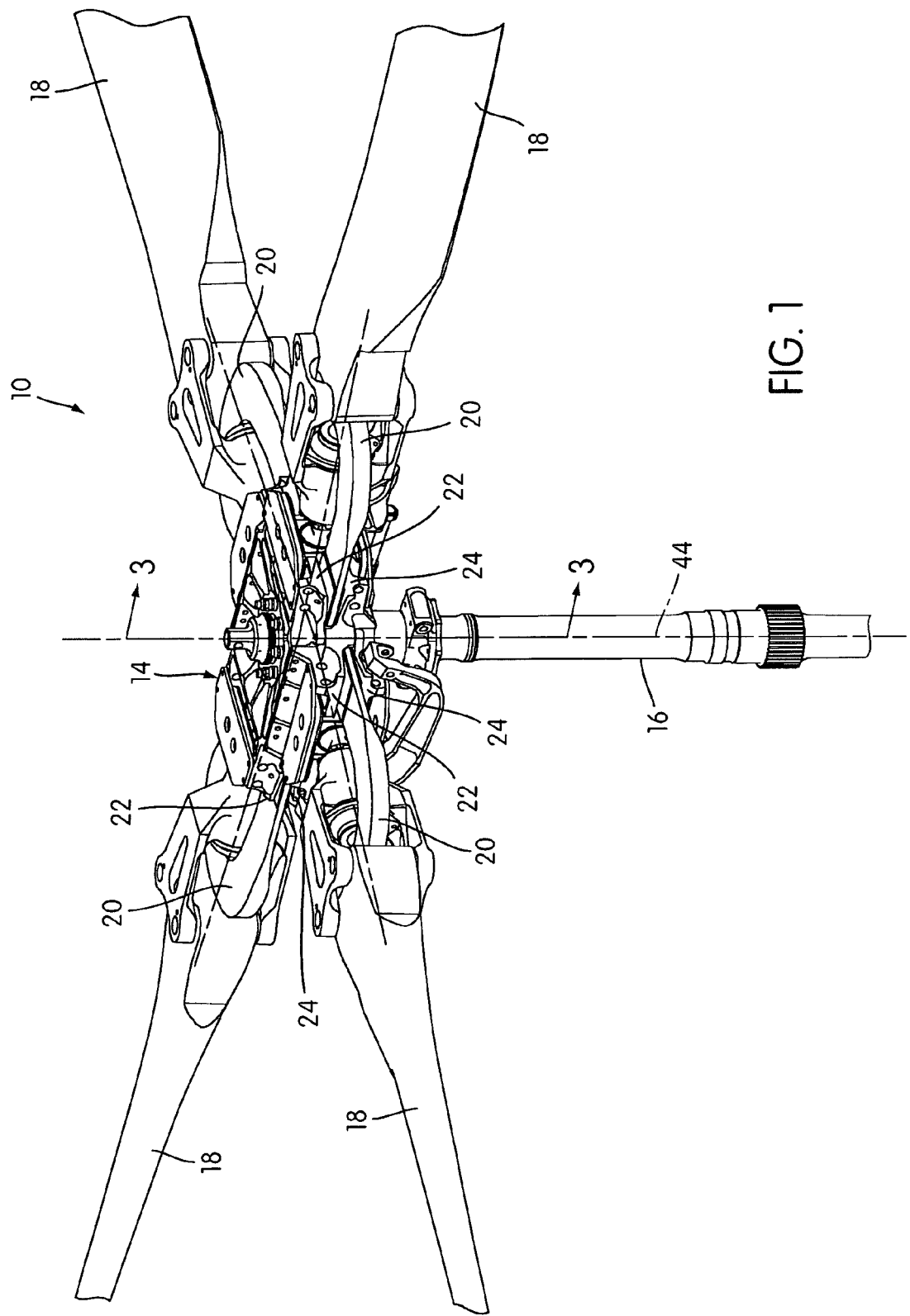
FIG. 1 is a perspective view illustrating a main rotor system of a helicopter in accordance with an embodiment of the invention.

FIG. 1 illustrates a main rotor system 10 for a helicopter including an embodiment of the flexure assembly in accordance with the subject application. Main rotor system includes a hub 14 mounted on a main rotor shaft 16 and a plurality of main rotor blades 18 coupled to and extending from the hub 14.

Main rotor systems are generally known in the art as disclosed in U.S. Pat. No. 4,650,401 to Yao et al., U.S. Pat. No. 5,358,381 to Covington et al.; U.S. Pat. No. 5,820,344 to Hamilton et al.; and U.S. Pat. No. 6,708,921 to Sims et al., each of which is incorporated herein in its entirety by reference thereto, respectively.

During flight, as the helicopter gains air speed, the increased air speed and lift on the advancing rotor blade 18 causes the advancing rotor blade 18 to flap up while the decreased lift on the retreating rotor blade 18 causes the retreating rotor blade 18 to flap down. The flapping of each blade 18 is accommodated by a flexible yoke 20 that is coupled between the hub 14 and each blade 18. Yoke 20 is relatively stiff in the chordwise direction but flexible in the flapping direction. In order to control the flapping of each blade 18, the yoke coupled between each blade 18 and hub 14 is supported by a curved, upper yoke support plate 22 and a curved, lower yoke support plate 24.

FIGS. 1-4 illustrate one embodiment of a main rotor system and, further, one embodiment of a hub 14, yoke 20, and blade 18 configuration. It should be understood that various embodiments may be employed and that FIGS. 1-4 and the other embodiments illustrated in this application only provide illustrated embodiments of a few of the embodiments of the invention.

Figure 2:
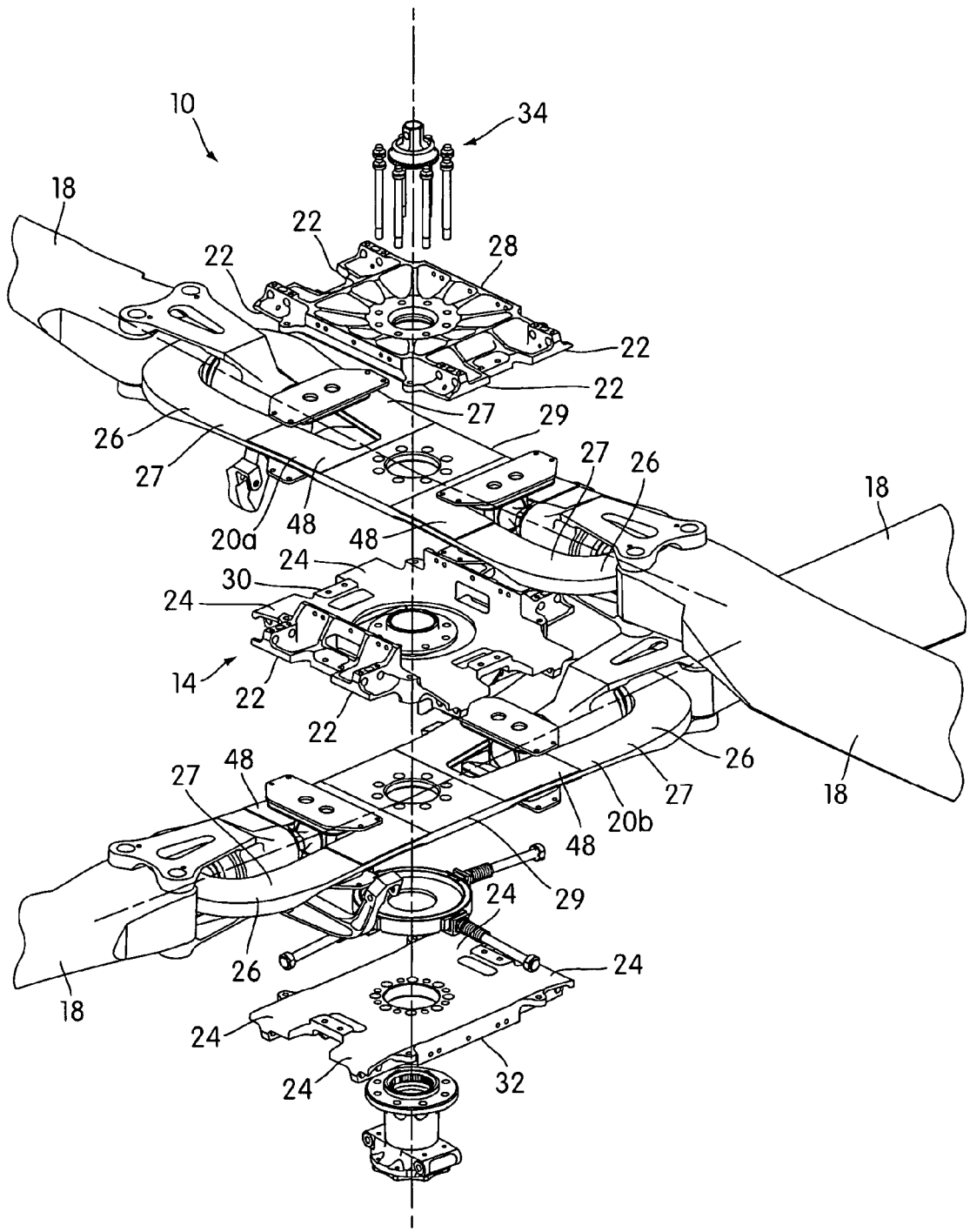
FIG. 2 is an exploded view of FIG. 1.

As seen in FIGS. 1 and 2, the yoke 20 of FIGS. 1 and 2 is an elongated yoke 20 configured with two loops 26, with one loop 26 for each blade 18. Each loop 26 forms a pair of arms 27 extending from the middle section 29 of the yoke 20. The illustrated yoke 20a is configured for use with two opposing blades 18 and with the use of a second, lower yoke 20b positioned beneath the first, upper yoke 20a. The second, lower yoke 20b being attached to each of the remaining two blades 18 of the rotor assembly 10. The yokes 20 may be made from various materials, including composite materials such as fiberglass.

The main rotor shaft 16 connects to and provides rotation to the hub 14 as generally known. The hub includes a pairs of support plates 22 and 24 for each blade 18. The upper support plates 22 the upper yoke 20a are provided on a top bracket 28, the lower support plates 24 for the upper yoke 20a and the upper support plates 22 for the lower yoke 20b are provided on a middle bracket 30, and the lower support plates 24 for the lower yoke 20b are provided on a bottom bracket 32. As mentioned above, each of the upper support plates 22 and each of the lower support plates 24 are curved as explained below. The upper yoke 20a is sandwiched between brackets 28 and 30 while lower yoke is sandwiched between brackets 30 and 32. The yokes 20a and 20b the brackets 28, 30, and 32 are secured together by appropriate fastening mechanisms, including mechanisms such as fasteners 34 such that the brackets 28, 30, and 32 clamp and support the yokes 20. The brackets 28, 30, and 32 and the support plates 22 and 24 may be made from a variety of materials, including metal. As evident from the drawings, once assembled, there is a upper support plate 22 and a lower support plate 24 for each arm 27 of each yoke 20.

To avoid redundancy, the discussion herein will focus on the connection between only one of the blades 18 and the hub 14 and the use of a single loop 26 of the yoke 20 since the connection between each of the blades 18 and the hub 14 and the respective use of the yoke 20 is substantially identical for the connection between each blade 18 and the hub 14.

Figure 3:
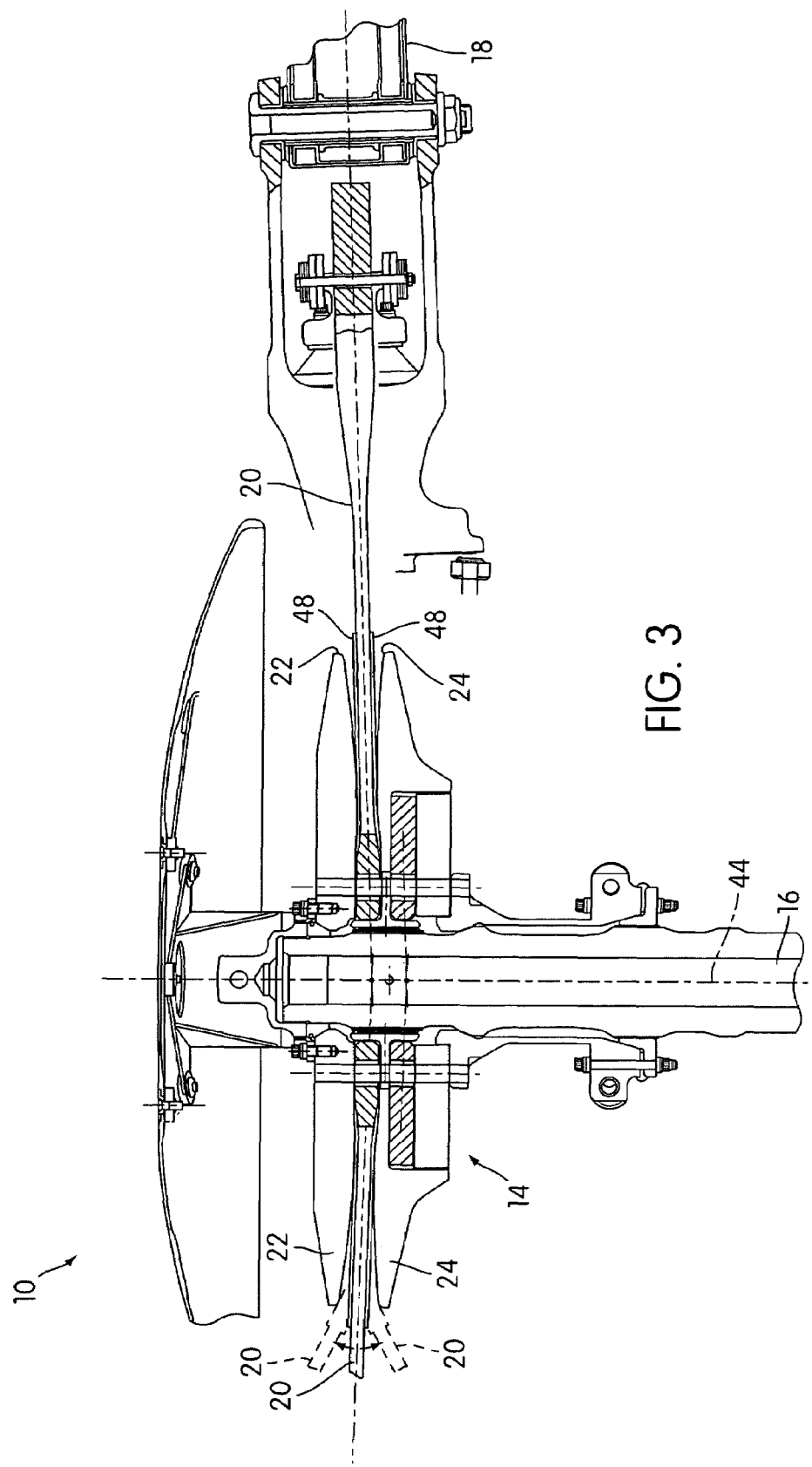
FIG. 3 is a cross-sectional, side elevational view taken along line 3-3 of FIG. 1.
Figure 4:
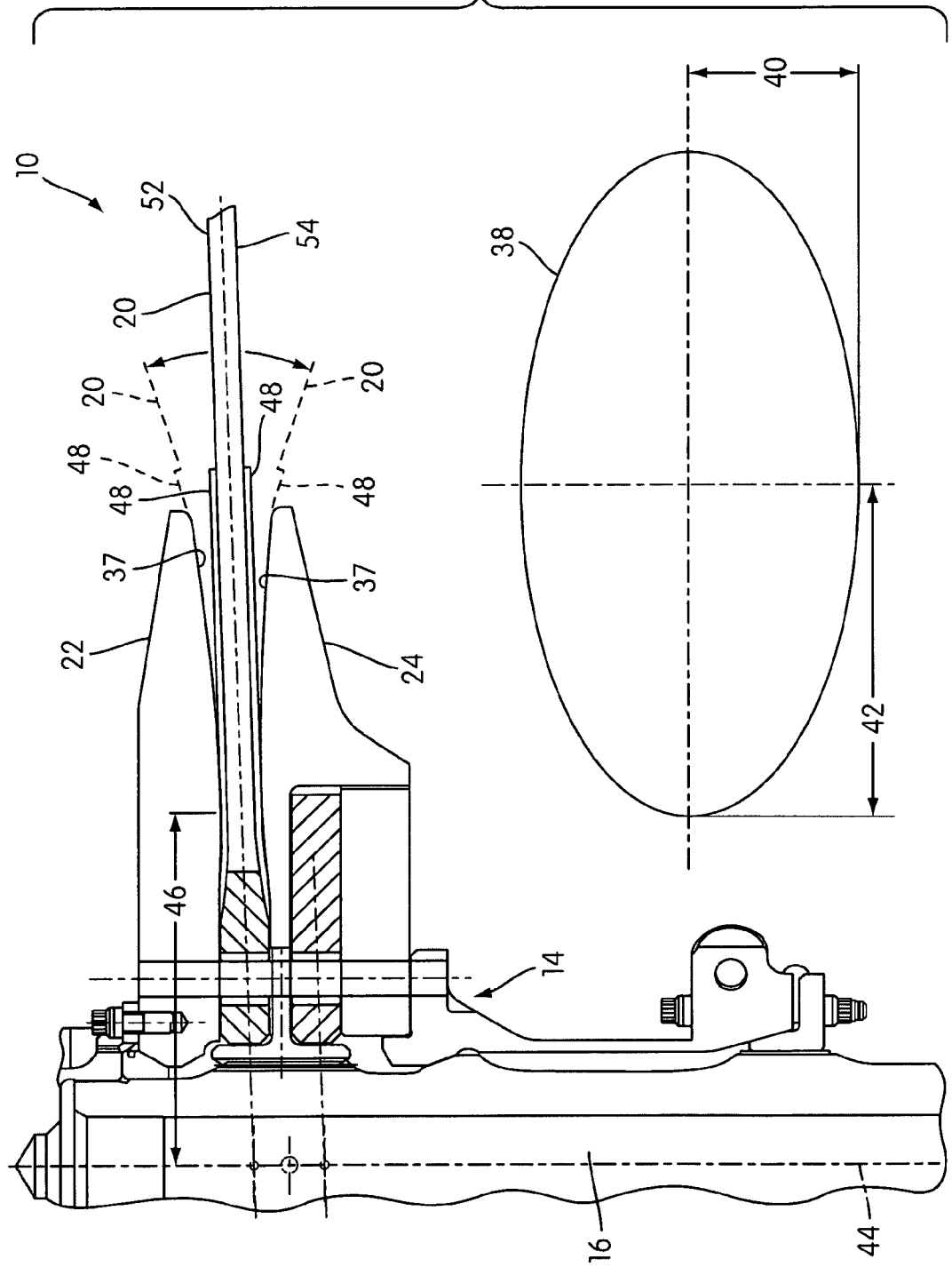
FIG. 4 is an enlarged view of FIG. 3 and additionally illustrating an example of the elliptical configuration of the yoke support plate surfaces.

As best seen in FIGS. 3 and 4, the upper and lower support plates 22 and 24 are curved to provide the desired flapping characteristics to the respective yoke 20 and to the respective blade 18. Thus, the blade 18 may flap up and down and abut the upper and lower plates as shown in dashed lines in FIGS. 3 and 4. As illustrated, each of upper and lower support plates 22 and 24 are curved to form a non-circular arc that does not form part of the circumference of a circle. Other embodiments, however, may include support plates 22 and 24 that are curved arcs of a circle. Also, although each of upper and lower support plates 22 and 24 are illustrated as having substantially identical curvatures, it should be understood that upper and lower plates 22 and 24 may have different curvatures than one another and, further, that other embodiments may include only one of the plates 22 and 24 being curved.

As illustrated in FIGS. 3 and 4, the curvature of the upper and lower plates 22 and 24 is elliptical to form an elliptical surface 37. That is, the shape of each of the upper and lower plates forms an arc or portion of an ellipse. For reference, FIG. 4 illustrates the ellipse 38 that corresponds to the curvature of the upper and lower plates 32 and 34 as shown in FIG. 4. The elliptical curvature provides enhanced control of the flapping of the blades 18. Although various curvatures are possible depending on the desired flapping characteristics of the blades 18, one embodiment employs an elliptical surface corresponding to a 8, 16 radius elliptical surface, for example, the minor axis 40 being approximately 8 inches and the major axis 42 being approximately 16 inches. Of course the location of the upper and lower plates and the position of their respective curvatures relative to the axis about which the hub 14 and shaft 16 rotate may be varied depending on the desired flapping characteristics. This distance 46 from the axis 44 of rotation to the tangent to the ellipse 38 forming the curvature of the upper and lower support plates 22 and 24 may be selected based on desired blade flapping characteristics. One example provides a distance 46 of approximately 5.102 inches.

Figure 5:
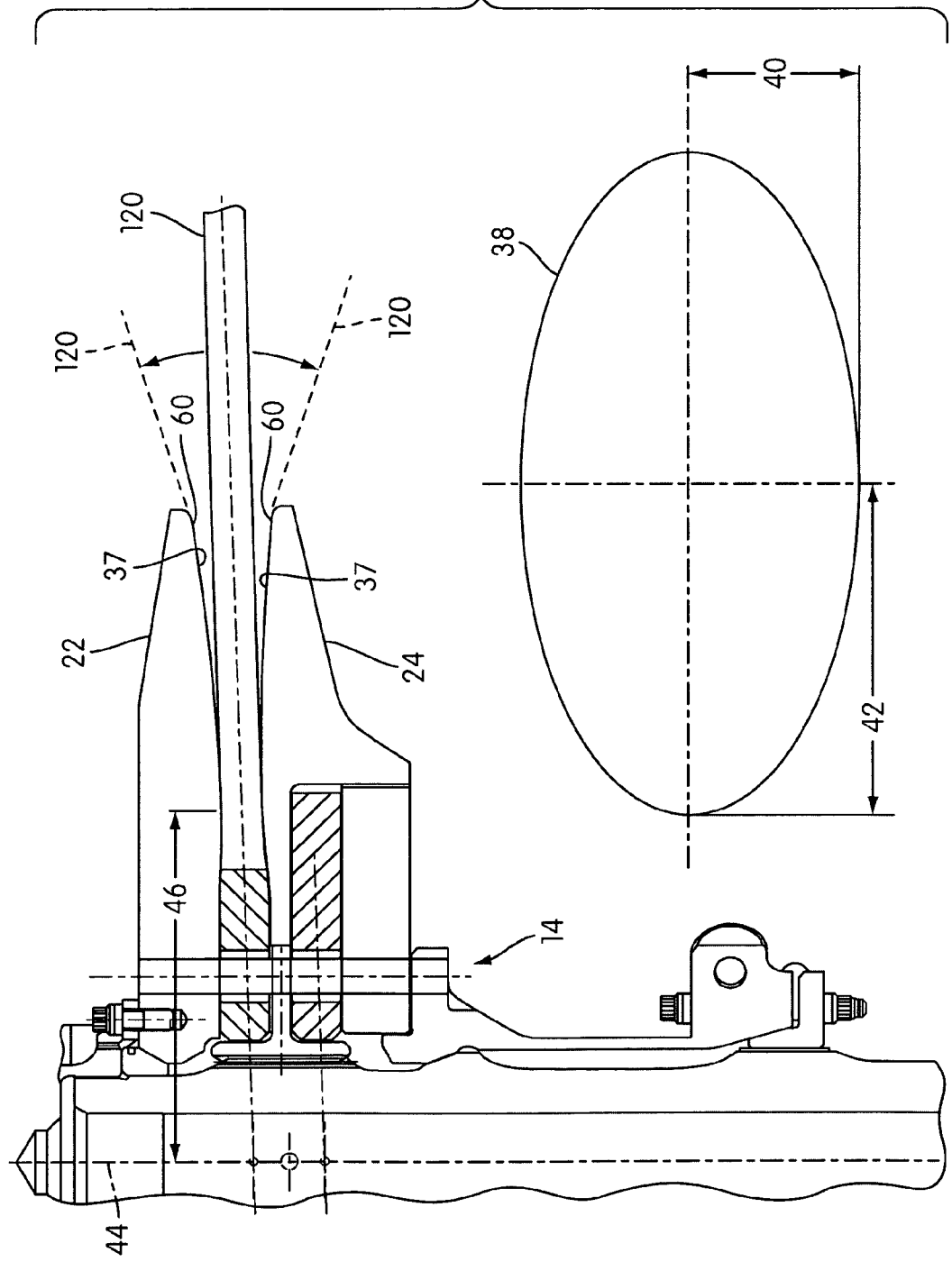
FIG. 5 is similar to FIG. 4 but shows another embodiment of an assembly, without cushioning on the yoke.

Since repeated flapping of a blade 18 against the upper and/or lower support plates 22 and 24 may cause damage to the yoke 20, a cushioning layer 48 may be provided to the yoke 20. Although, FIGS. 1-4 illustrate a cushioning layer 48 on both an upper yoke surface 52 and a lower yoke surface 54, it should be understood that only one of the upper and lower yoke surfaces 52 and 54 may have the cushioning material. Also, as seen in FIG. 5, cushioning material may be omitted entirely and the yoke 120 may be capable of contacting the upper and lower contacting plates with no cushioning material. Otherwise, FIG. 5 is substantially identical to the assembly of FIG. 4.

Figure 6:
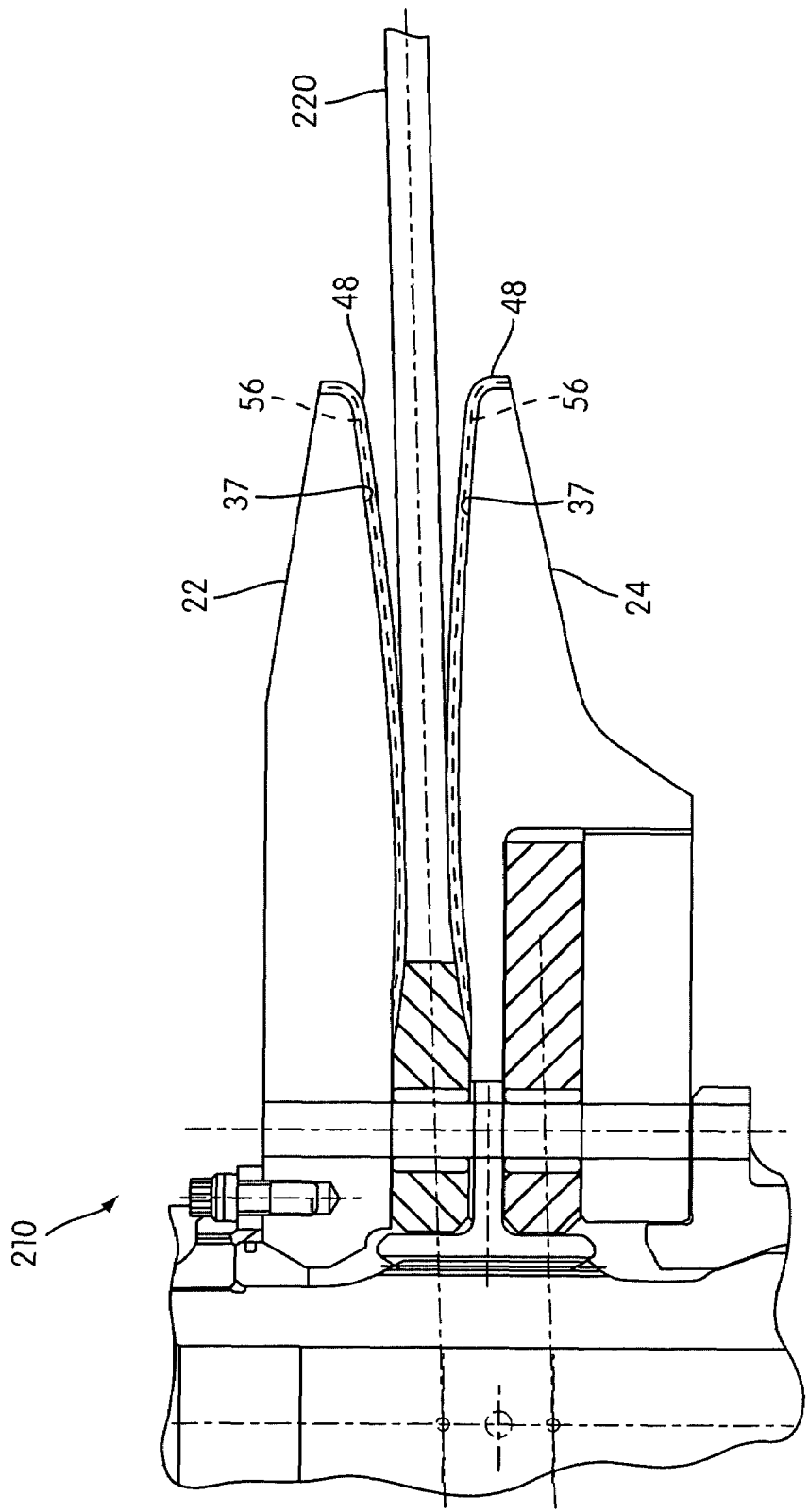
FIG. 6 is an enlarged view similar to FIG. 4 but illustrating another embodiment in accordance with the subject invention illustrating cushioning material on the support plates instead of on the yoke as illustrated in FIG. 4.

Additionally, as seen in FIG. 6, the layer of cushioning material 48 may be placed on the upper and lower support plates 22 and 24. FIG. 6 illustrates a rotor assembly 210 that is substantially identical to rotor assembly 10 except for the positioning of the cushioning material being placed on the support plates 22 and 24 instead of on the yoke 20 as in FIGS. 1-4. Also, although FIG. 6 illustrates cushioning material on both upper and lower support plates 22 and 24, only the upper support plates 22 or, alternatively, only the lower support plates 24 may have cushioning material 48 instead of both upper and lower support plates 22 and 24 for each blade 18 as shown.

The cushioning material 48 may be any appropriate cushioning material, including elastomeric material, rubber, and polymers such as urethane. The density of the cushioning material 48 may also be selected depending on the desired cushioning durability of the cushioning material 48. Additionally, the material 48 may include a reinforcement member 56 to improve durability by, for example a cloth embedded in the cushioning material 48. One example is to provide a fluorocarbon polymer fabric such as Teflon cloth embedded or otherwise adhered to the cushioning material 48, such as rubber, to increase durability. Still further a protective layer 58 may be provided to the exterior surfaces of the cushioning material 48 to increase durability. For example, the protective layer may be sprayed on the cushioning layer 48. One example of a material to be applied to the cushioning material as a protective layer 58 is a fluorocarbon polymer such as Teflon. Additionally, the reinforcing of cushioning layer 48 may occur regardless of whether the layer 48 is applied to either or both sides of the yoke 20 or to either or both sides of the support plates 22 and 24. Also, the thickness of the cushioning material 48 may be as desired to achieve the desired cushioning characteristics. For example, the cushioning material may be, in one embodiment, 0.100 inches thick on each side of the yoke 20, wherein the yoke may have, for example, a thickness of 0.380 inches.

Further, a protective layer 60 may be provided to the exterior surfaces of one or both of the support plates 22 and 24 for each blade 18 to increase the durability of the plates 22 and 24 as well as the life of any cushioning material 48. For example, the protective layer 60 may be sprayed on one or both support plates 22 and 24. One example of a material to be applied to the support plates as a protective layer 60 is a fluorocarbon polymer such as Teflon. Additionally, the reinforcing of support plates 22 and 24 may occur regardless of whether the cushioning layer 48 is applied to either or both sides of the yoke 20 or to either or both sides of the support plates 22 and 24. Also, the protective layer 60 may be used on plates 22 and 40 when no cushioning material is used as in FIG. 5.

The configurations disclosed herein are beneficial in that they may provide an increase to the rotor flapping without increasing the flexure length by providing beamwise support to the yoke and using a thinner yoke to reduce the stress thereof. This allows flexure-type rotor hubs to accommodate the increased flapping required by stiffer pylon mounting and center of gravity range. The configurations herein reduce the shear stress for a given amount of flapping by making the yoke thinner while reacting beam forces with external features, such as the curvature of the yoke support plates 22 and 24. Existing main rotor flapping flexure-types hubs are typically limited to approximately plus or minus 5 degrees. However, by employing the principles disclosed herein the range of flapping is increased over previous levels, for example to flapping of approximately plus or minus 8-10 degrees.

Figure 7:
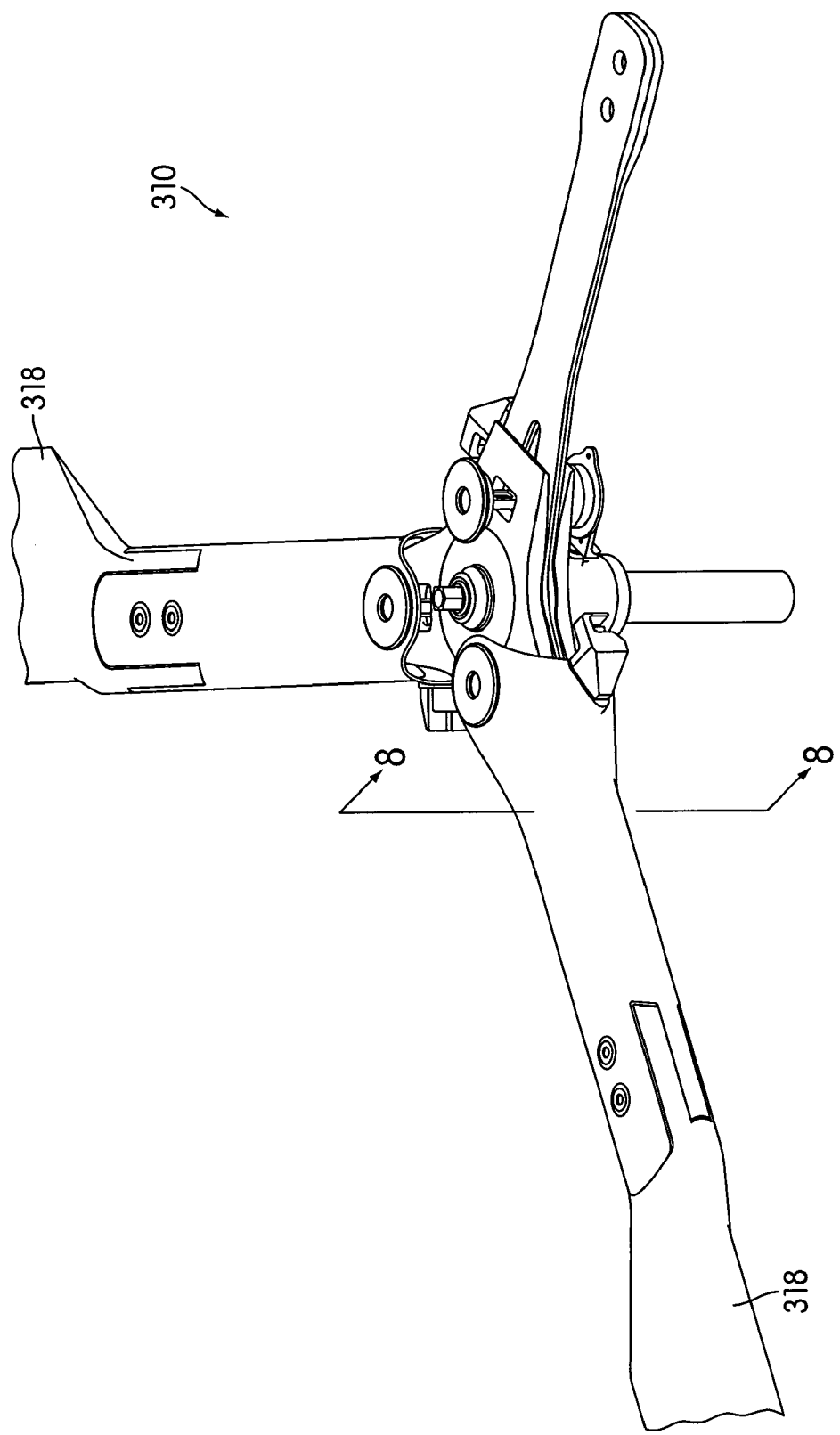
FIG. 7 is a perspective view of a rotor system in accordance with another embodiment of the invention employing curved yoke support plates in accordance with an embodiment of the invention.
Figure 8:
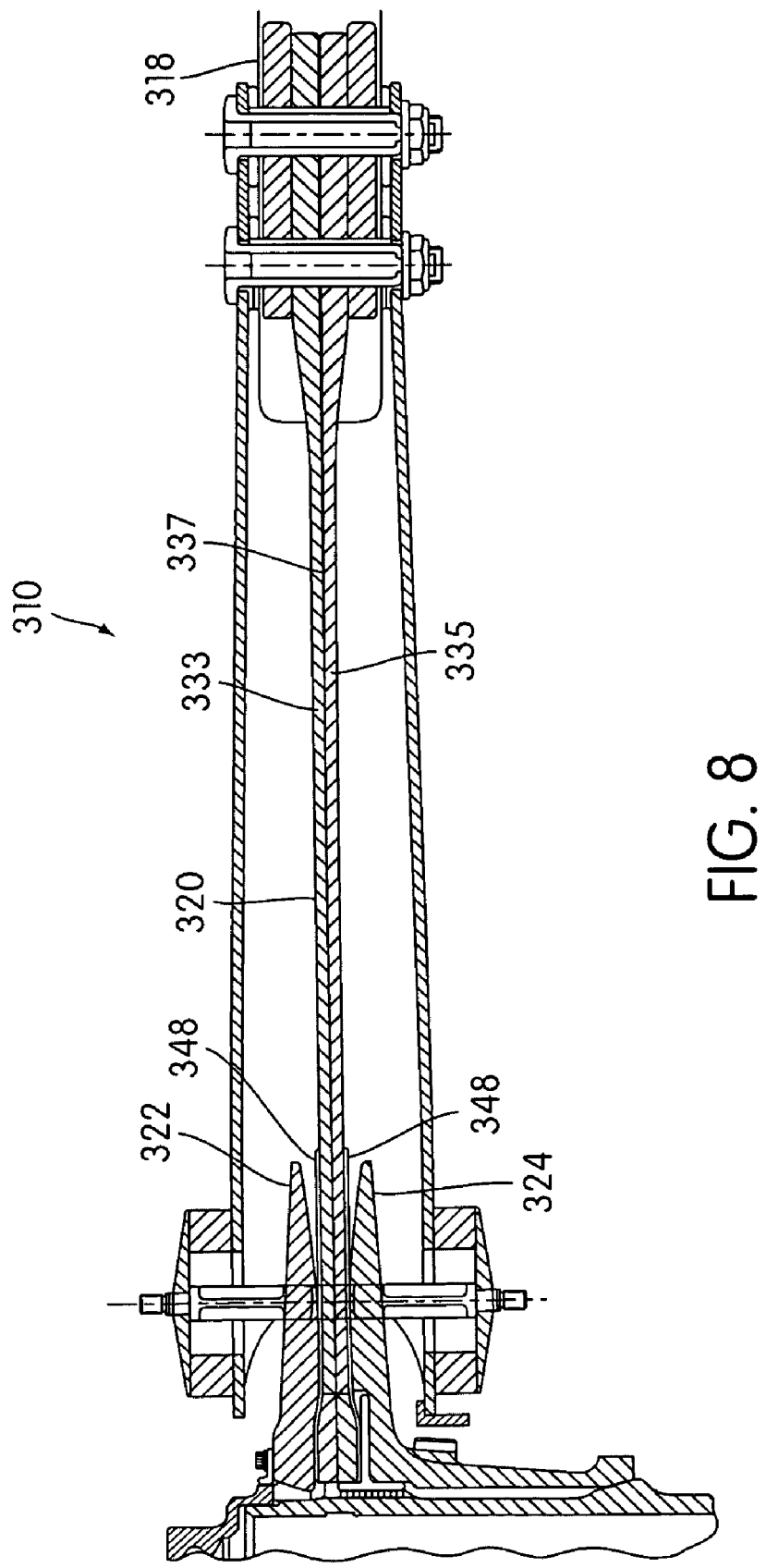
FIG. 8 is a side, elevational cross-sectional view taken along line 8-8 in FIG. 7.

The principles described above are equally applicable on various rotor systems and configurations, For example, FIGS. 7 and 8 illustrate another embodiment of the invention wherein the curved support plates are provided to a rotor system 310 having three blades 318. Although configured for three blades instead of four as with FIGS. 1-4 above, the rotor system of 310 is substantially identical in application with the upper and lower support plates 322 and 324, yoke 320, and cushioning material 348 functioning substantially identically as described above with respect to plates 22 and 24, yoke 20, and cushioning material 48, respectively. Additionally, FIG. 8 illustrates a two-piece yoke having an upper yoke layer 333 and a lower yoke layer 335 with an optional cushioning material 337 positioned therebetween. The cushioning material 337 may be substantially identical to cushioning material 48. The two-piece yoke is equally applicable to all embodiments herein.

Figure 9:
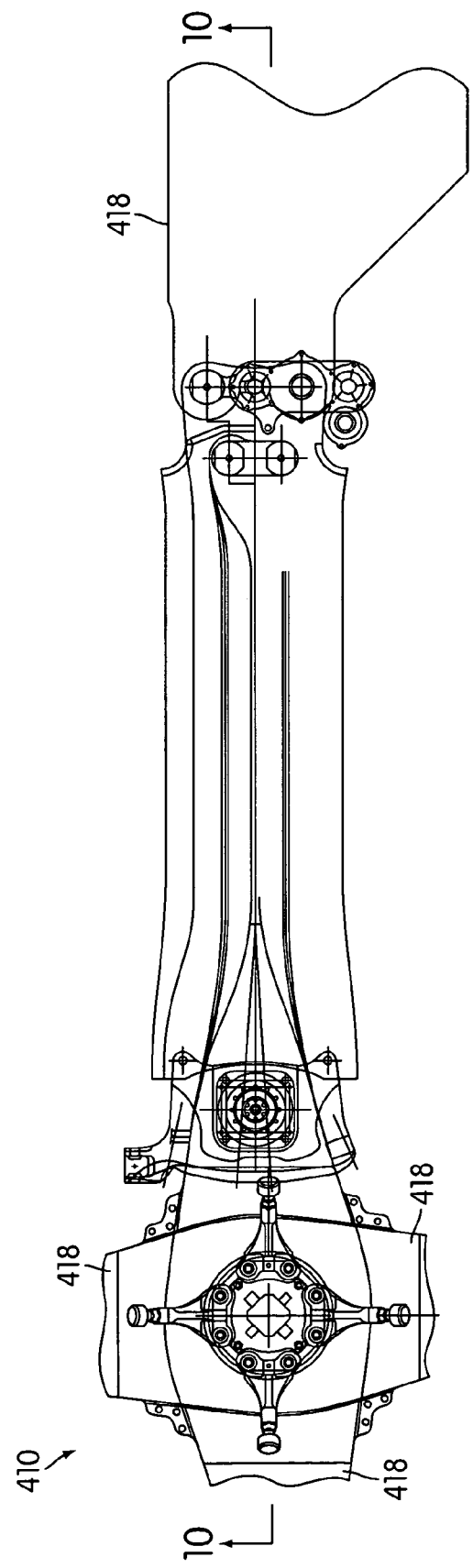
FIG. 9 is a top view of a rotor system in accordance with another embodiment of the invention employing curved yoke support plates in accordance with an embodiment of the invention.
Figure 10:
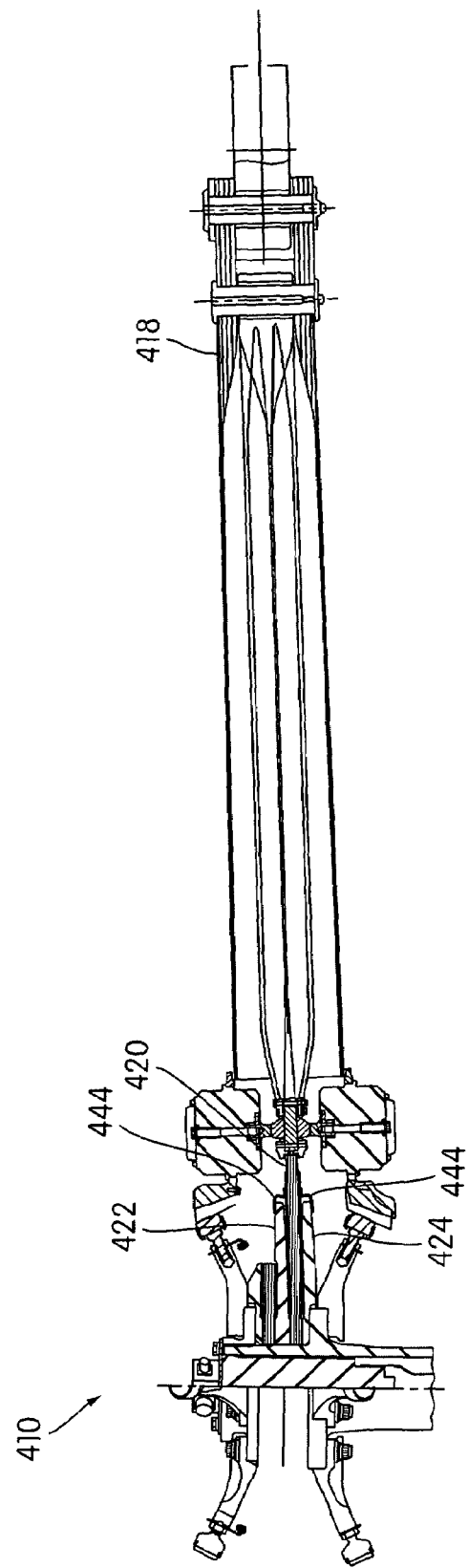
FIG. 10 is a side, elevational, partial cross-sectional view taken along line 10-10 in FIG. 9.
Figure 11:
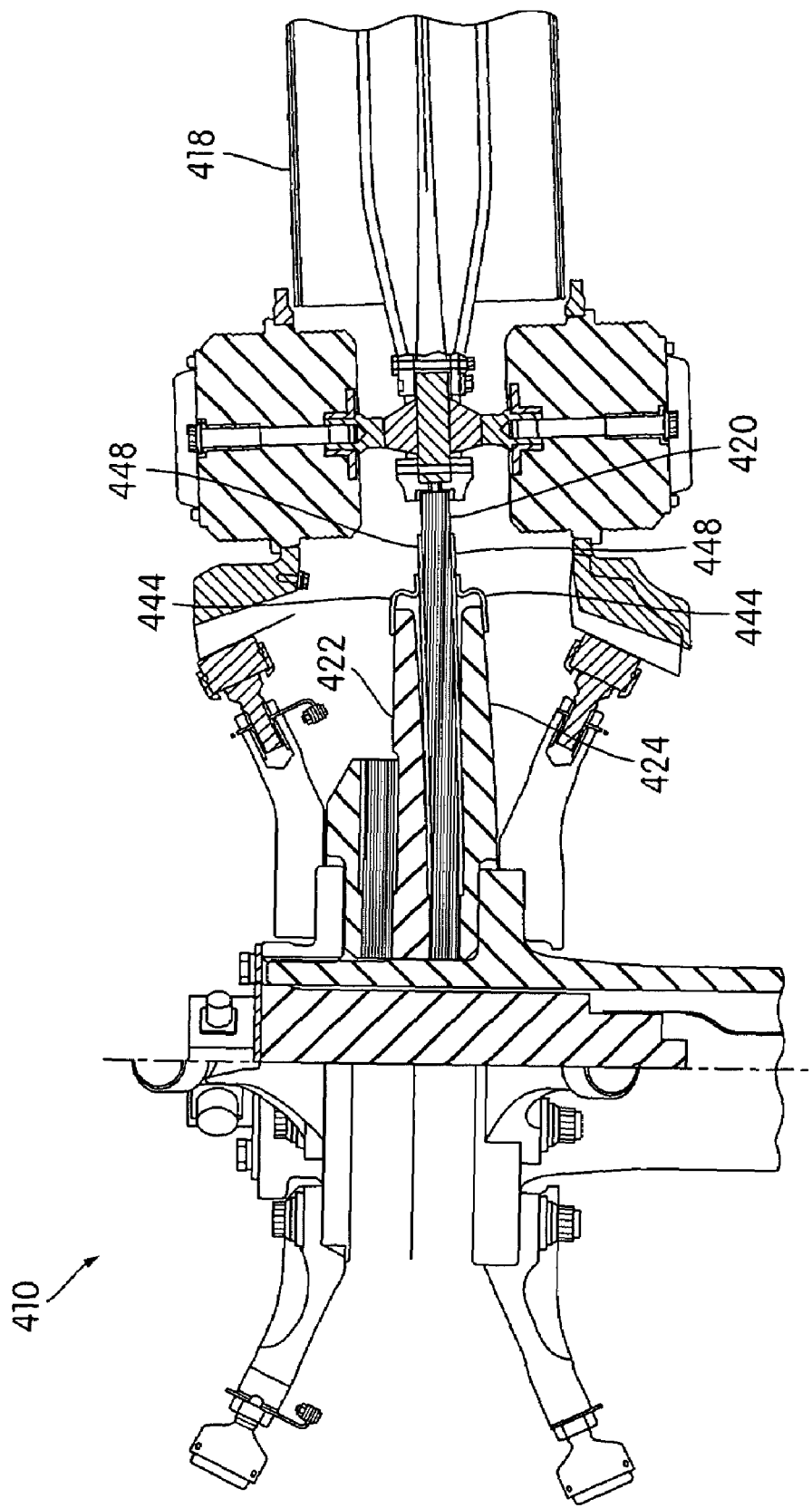
FIG. 11 is an enlarged view of FIG. 10.

As another example, FIGS. 9-11 illustrate another embodiment of the invention wherein the curved support plates are provided to a rotor system 410 having four blades 418, but supported and configured differently from the blades 18 illustrated in FIGS. 1-4. Although configured differently for four blades than with the embodiment of FIGS. 1-4 above, the rotor system of 410 is substantially identical in application with the upper and lower support plates 422 and 424, yoke 420, and cushioning material 448 functioning substantially identically as described above with respect to plates 22 and 24, yoke 20, and cushioning material 48, respectively. Additionally, FIGS. 9-11 illustrate a protective boot 444 to enclose the upper and lower plates 422 and 424 and protect them from debris and foreign particles and is useful in keeping debris and foreign particles out from between the yoke 420 and the support plates 422 and 424. The boot 444 may be made from material such as rubber or elastomer and can be equally applied to any of the various embodiments herein.

Figure 12:
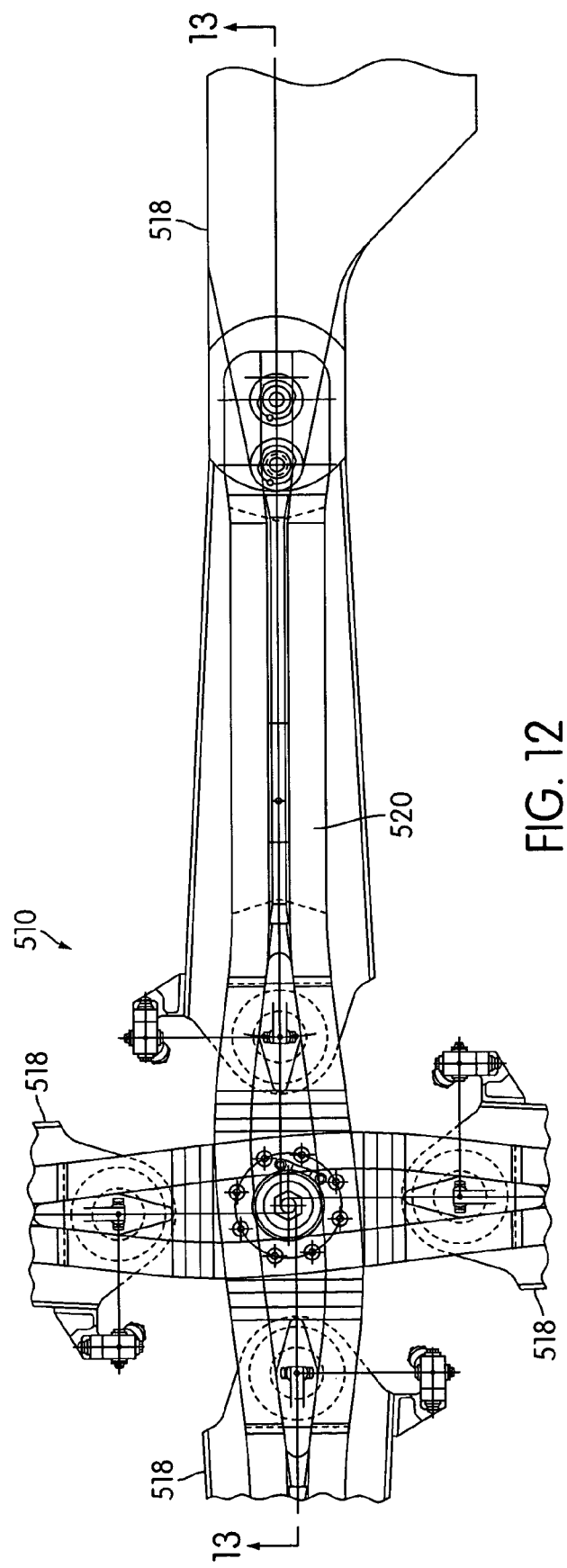
FIG. 12 is a top view of a rotor system in accordance with another embodiment of the invention employing curved yoke support plates in accordance with an embodiment of the invention.
Figure 13:
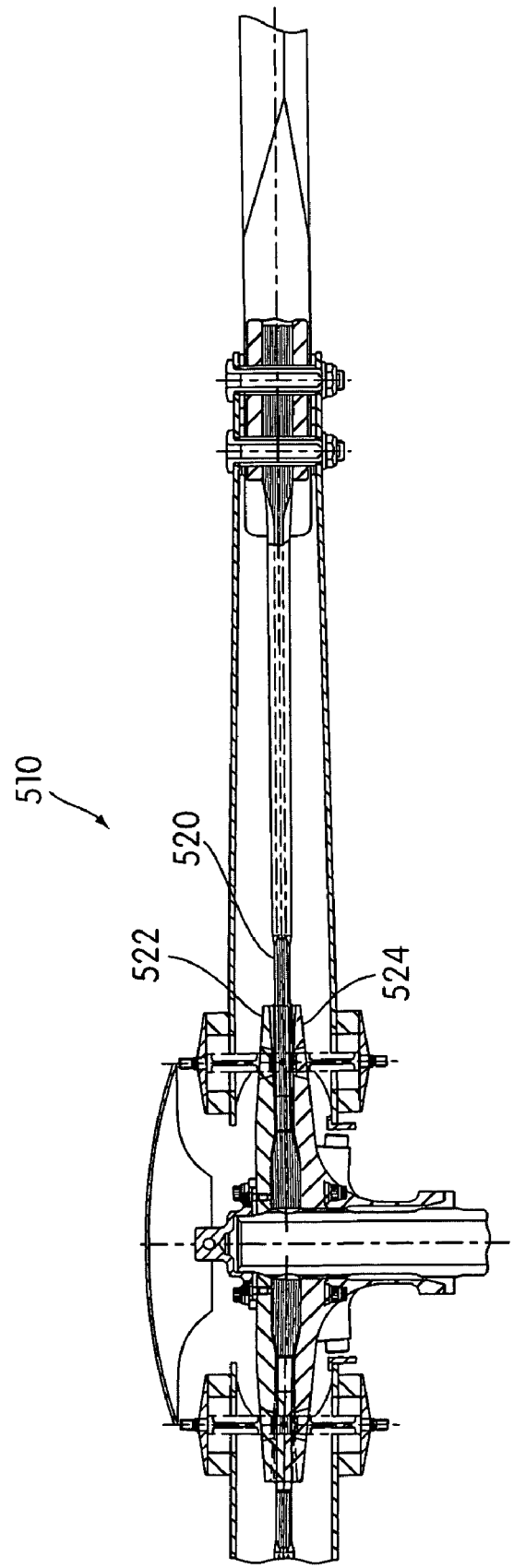
FIG. 13 is a side, elevational, cross-sectional view taken along line 13-13 in FIG. 12.
Figure 14:
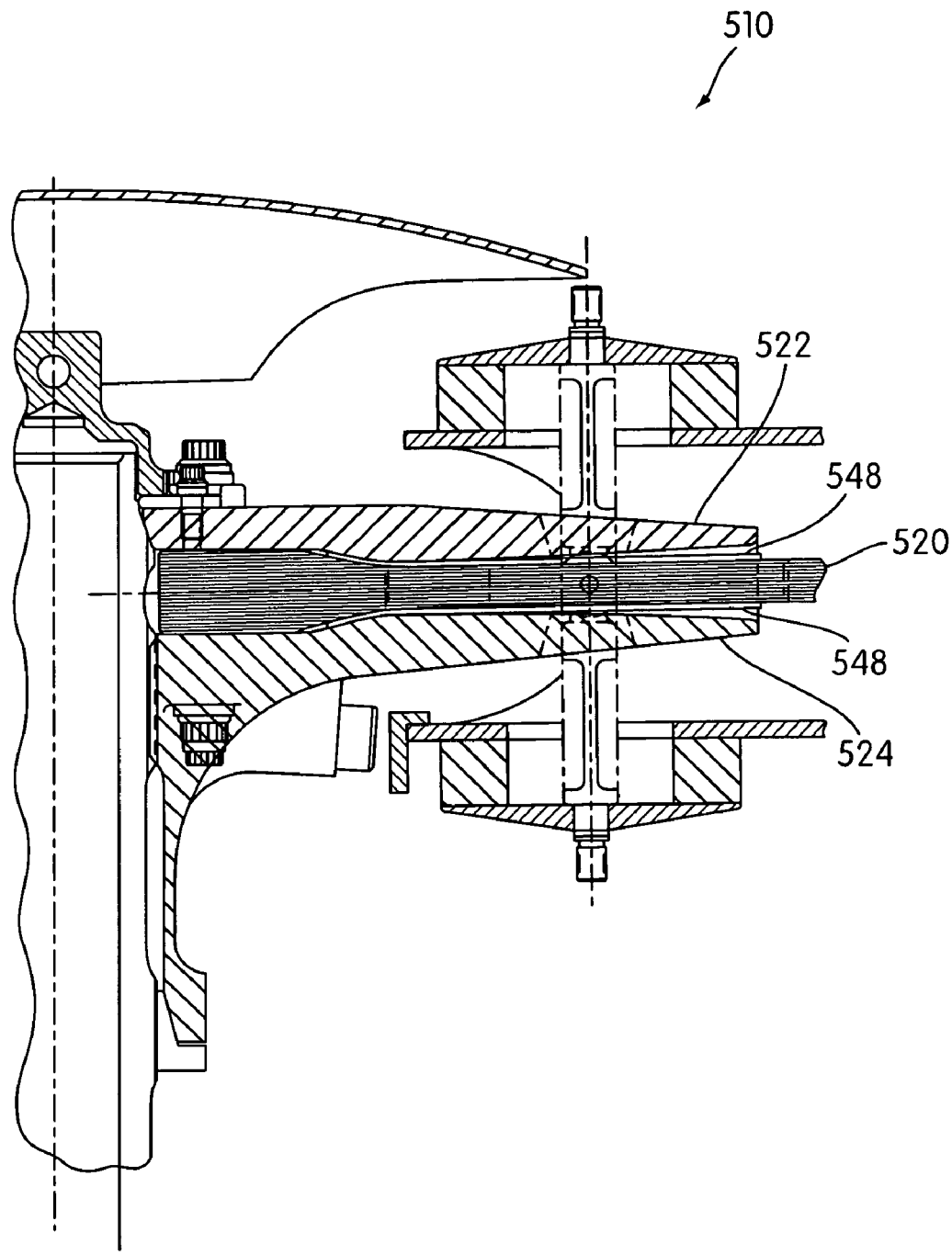
FIG. 14 is an enlarged view of FIG. 13.

As another example, FIGS. 12-14 illustrate yet another embodiment of the invention wherein the curved support plates are provided to a rotor system 510 having four blades 518, but supported and configured differently from the blades 18 illustrated in FIGS. 1-4. Although configured differently for four blades than with the embodiment of FIGS. 1-4 above, the rotor system of 510 is substantially identical in application with the upper and lower support plates 522 and 524, yoke 520, and cushioning material 548 functioning substantially identically as described above with respect to plates 22 and 24, yoke 20, and cushioning material 48, respectively.

The foregoing embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. An assembly for providing flexure to a blade of a rotary blade system, comprising:
    an upper support plate having an upper curved surface;
    a lower support plate having a lower curved surface; and
    a yoke positioned between said upper support plate and said lower support plate, said yoke having an upper yoke surface and a lower yoke surface,
    a first yoke surface of said upper and lower yoke surfaces having a layer of cushioning material positioned on and secured to said first yoke surface, said layer of cushioning material extending along and following the general contour of said first yoke surface, and said layer of cushioning material directly contacting said upper curved surface of said upper support plate or said lower curved surface of said lower support plate, or both.

2. An assembly according to claim 1, wherein said first yoke surface is said upper yoke surface and said layer of cushioning material is an upper layer of cushioning material positioned on and secured to said upper yoke surface, wherein said upper layer of cushioning material extends along and follows the general contour of said upper yoke surface and said upper cushioning material directly contacts said upper curved surface of said upper support plate.

3. An assembly according to claim 1, further comprising:
    a lower layer of cushioning material positioned on and secured to said lower yoke surface, wherein said lower layer of cushioning material extends along and follows the general contour of said lower yoke surface and said lower cushioning material directly contacts said lower curved surface of said lower support plate.

4. An assembly according to claim 1, wherein said upper curved surface, or said lower curved surface, or both, is a non-circular arc that does not form part of a circumference of a circle.

5. An assembly according to claim 1, wherein each of said upper curved surface and said lower curved surface is a non-circular arc that does not form part of a circumference of a circle.

6. An assembly according to claim 1, wherein said upper curved surface has the shape of a portion of an ellipse.

7. An assembly according to claim 1, wherein each of said upper curved surface and said lower curved surface has the shape of a portion of an ellipse.

8. An assembly according to claim 1, wherein said yoke is formed of composite material.

9. An assembly according to claim 1, wherein said layer of cushioning material is formed of rubber.

10. An assembly according to claim 1, wherein said layer of cushioning material is formed of elastomeric material.

11. An assembly according to claim 1, wherein said layer of cushioning material is formed of a polymer.

12. An assembly according to claim 11, wherein said polymer is urethane.

13. An assembly according to claim 1, wherein said layer of cushioning material includes a first protective layer.

14. An assembly according to claim 13, wherein said first protective layer is a fabric layer.

15. An assembly according to claim 14, wherein said fabric layer is formed of fluorocarbon polymer.

16. An assembly according to claim 1, wherein one of said upper and lower support plates includes a cushioning layer for directly contacting said layer of cushioning material of said yoke.

17. An assembly according to claim 1, wherein one of said upper and lower support plates include a protective layer for directly contacting said layer of cushioning material of said yoke.

18. An assembly according to claim 13, wherein one of said upper and lower support plates include a second protective layer for directly contacting said layer of cushioning material of said yoke.

19. An assembly according to claim 17, wherein said protective layer is formed of a fluorocarbon polymer.

20. An assembly according to claim 1, wherein said yoke has a constant thickness along its length.

21. An assembly according to claim 1, wherein said yoke is a two-piece yoke having a top yoke and a bottom yoke with said upper yoke surface being the upper yoke surface of said top yoke and said lower yoke surface being the lower yoke surface of said bottom yoke.

22. An assembly according to claim 3, wherein said yoke is a two-piece yoke having a top yoke and a bottom yoke with said upper yoke surface being the upper yoke surface of said top yoke and said lower yoke surface being the lower yoke surface of said bottom yoke.

23. An assembly according to claim 22, wherein said two-piece yoke has a cushioning material positioned between said top yoke and said bottom yoke.

24. An assembly for providing flexure to a blade of a rotary blade system, comprising:
    an upper support plate having an upper curved surface;
    a lower support plate having a lower curved surface substantially identical to the upper curved surface; and
    a yoke positioned between and directly contacting said upper support plate and said lower support plate, the yoke including an upper part and a separate lower part extending substantially along a same direction, the upper part contacting the upper support plate and the lower part contacting the lower support plate,
    wherein a contour of said upper curved surface and a contour of said lower curved surface have a shape of a portion of an ellipse.

25. An assembly according to claim 24, wherein said yoke includes an upper yoke surface and a lower yoke surface, and a first cushioning material is positioned between said upper yoke surface and said upper curved surface of said upper support plate and a second cushioning material is positioned between said lower yoke surface and said lower curved surface.

26. An assembly according to claim 25, wherein said first cushioning material is attached to said upper support plate, and said second cushioning material is attached to said lower support plate.

27. An assembly according to claim 24, wherein said yoke is formed of composite material.

28. An assembly according to claim 25, wherein each of said first and second cushioning material is rubber.

29. An assembly according to claim 24, wherein said yoke includes an upper yoke surface and a lower yoke surface, and a first protective material is positioned between said upper yoke surface and said upper curved surface of said upper support plate and a second protective material is positioned between said lower yoke surface and said lower curved surface.

30. An assembly according to claim 29, wherein each of said protective layers is formed of a fluorocarbon polymer.

31. An assembly according to claim 24, wherein said yoke has a constant thickness along its length.

32. An assembly according to claim 24, wherein said yoke is a two-piece yoke having a top yoke and a bottom yoke with an upper yoke surface of said top yoke contacting said upper support plate and a lower yoke surface of said bottom yoke contacting said lower support plate.

33. An assembly according to claim 1, further comprising: a protective covering enclosing said upper and lower support plates and said yoke.

34. An assembly according to claim 24, further comprising: a protective covering enclosing said upper and lower support plates and said yoke.

35. An assembly according to claim 24, further comprising a layer of cushioning material positioned between the upper part and the lower part of the yoke.

36. An assembly according to claim 35, wherein the layer of cushioning material is in contact with the upper part and the lower part of the yoke.

37. An assembly for providing flexure to a blade of a rotary blade system, comprising:
    an upper support plate having an upper curved surface;
    a lower support plate having a lower curved surface; and
    a yoke positioned between said upper support plate and said lower support plate, said yoke including an upper part and a separate lower part extending substantially along a same direction, said upper part having an upper yoke surface and said lower part having a lower yoke surface,
    a first yoke surface of said upper and lower yoke surfaces having a layer of cushioning material positioned on and secured to said first yoke surface, said layer of cushioning material extending along and following the general contour of said first yoke surface, and said layer of cushioning material directly contacting said upper curved surface of said upper support plate or said lower curved surface of said lower support plate, or both.

38. An assembly according to claim 37, further comprising a layer of cushioning material positioned between the upper part and the lower part of the yoke.

39. An assembly according to claim 38, wherein the layer of cushioning material positioned between the upper part and the lower part of the yoke is in contact with the upper part and the lower part of the yoke.

40. An assembly for providing flexure to a blade of a rotary blade system, comprising:
    an upper support plate having an upper curved surface;
    a lower support plate having a lower curved surface;
    a yoke positioned between and directly contacting said upper support plate and said lower support plate, the yoke including an upper part and a separate lower part extending substantially along a same direction, the upper part contacting the upper support plate and the lower part contacting the lower support plate; and
    a cushioning material positioned between said upper part of the yoke and said lower part of the yoke,
    wherein the cushioning material is softer than a material of said upper part of the yoke and a material of said lower part of the yoke.

41. An assembly according to claim 40, further comprising another cushioning material positioned between said upper part and said upper curved surface of said upper support plate, or between said lower part and said lower curved surface of said lower support plate, or both.

* * * * *